United States Patent [19]
Frank et al.

[11] 3,748,569
[45] July 24, 1973

[54] REGULATED SHORT CIRCUIT PROTECTED POWER SUPPLY

[75] Inventors: Gilbert Haven Frank, Columbia; John L. Thomas, Reisterstown, both of Md.

[73] Assignee: The United States of America as represented by the Secretary of the Army, Washington, D.C.

[22] Filed: Apr. 13, 1972

[21] Appl. No.: 243,710

[52] U.S. Cl.................... 323/9, 317/23, 317/33 VR
[51] Int. Cl. .............................................. G05f 1/58
[58] Field of Search ................... 317/31, 33 VR, 54; 323/9

[56] References Cited
UNITED STATES PATENTS

| | | | |
|---|---|---|---|
| 3,074,006 | 1/1963 | Klees | 323/9 |
| 3,201,680 | 8/1965 | Ross et al. | 323/9 |
| 3,521,150 | 7/1970 | Bates | 323/9 |
| 3,641,423 | 2/1972 | Stauffer | 323/9 |

*Primary Examiner*—A. D. Pellinen
*Attorney*—Richard S. Sciascia, John W. Pease et al.

[57] ABSTRACT

A voltage regulated power supply utilizing a small series resistance to sense load current and a circuit including a normally "off" trigger transistor having its base connected to the load side of the series resistor for actuation to "on" condition responsive to voltage drop in the resistor and a series switching transistor having its base connected to the output of the trigger transistor to shut off the series switching transistor in an overload condition which in turn interrupts operation of a series transistor by interrupting base current thereto. The circuit also includes a latching zener diode connected to the base of the trigger transistor to maintain its "on" condition after overload to maintain the power supply inoperative until the fault is removed and the supply is recycled.

2 Claims, 2 Drawing Figures

PATENTED JUL 24 1973 3,748,569

3,748,569

REGULATED SHORT CIRCUIT PROTECTED POWER SUPPLY

BACKGROUND OF THE INVENTION

The invention relates to the field of regulated electrical power supply circuits.

Protection of a regulated power supply and the associated load transistor from over-current damage by way of conventional fuse means is not satisfactory because frequently one or more transistors are destroyed before the fuse can act to eliminate the overload. The circuit of the subject invention operates electronically and provides interruption of load before transistor damage can occur. Other prior art overload protection means are designed as internal parts of a specific circuit. The subject invention is applicable as an addition to basic existing regulated power supplies and as such provides a relatively simple means for providing overload protection for existing regulated power supply circuits which include a current source amplifying transistor and series regulating transistor. In a further aspect of the invention there is provided a simple means of a latching zener diode circuit to maintain the power supply circuit in inoperative condition until the load fault is removed and the power supply is recycled.

SUMMARY OF THE INVENTION

The invention is applicable to voltage regulated power supplies which include a zener diode for voltage regulation, a current source amplifying transistor and series regulating transistor and provides short circuit protection for such existing equipment by the application of a sensing resistor, a trigger transistor and a series switching tran-sistor. In the arrangement, the trigger transistor is connected to control the base bias on the series switching transistor responsive to an overload voltage drop in the trigger transistor. In a further aspect of the invention a latching zener diode is connected to the base of the trigger transformer and to ground to maintain an "on" bias for the trigger transistor when the actuating bias from the sensing resistor is removed therefrom by inactivation of the load transistor and hence automatically maintains the regulated power supply in inoperative condition until the load short is removed and the circuit is recycled for operation.

DESCRIPTION OF THE PREFERRED EMBODIMENTS

Figure 1:
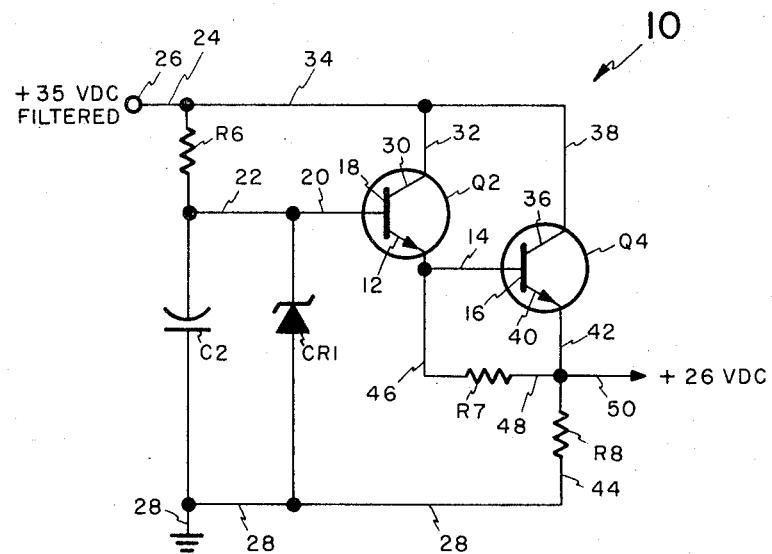
FIG. 1 shows diagramatically a fundamental conventional voltage regulated power supply.

In FIG. 1 there is shown a typical voltage regulated power supply generally designated by numeral 10. Circuit 10 includes a current source amplifying transistor Q2 and a series regulating transistor Q4, both of the NPN type. The amplifying transistor Q2 has its emitter 12 connected by line 14 to the base 16 of the series regulating transistor Q4 to control its operation. Positive voltage is applied to the base 18 of the transistor Q2 via lines 20 and 22, resistor R6 and line 24 from voltage source 26. A capacitor C2, used as a regulating filter, is connected from line 22 to a grounded line 28. A voltage regulating reference zener CR1 is connected from line 22 to grounded line 28 to maintain a desired voltage on the base 18 of amplying transistor Q2. The collector 30 of transistor Q2 is connected via lines 32, 34 and 24 to voltage source 26. The collector 36 of transistor Q4 is connected to source 26 via lines 38, 34 and 24. A load resistor R8 connects between the emitter 40 of transistor Q4 and grounded line 28 via lines 42 and 44. A voltage regulated output line 50 is connected via line 42 in series with transistor Q4. A feedback resistor R7 is connected from the emitter 12 of transistor Q2 to the emitter 40 of transistor Q4 via lines 46, 48 and 42. In the typical regulated supply circuit of FIG. 1, without any short circuit protection, the output voltage on line 50 is equal to $V_{CR1} - 2V_{be}$ or about $+ 26$ VDC in this application.

Figure 2:
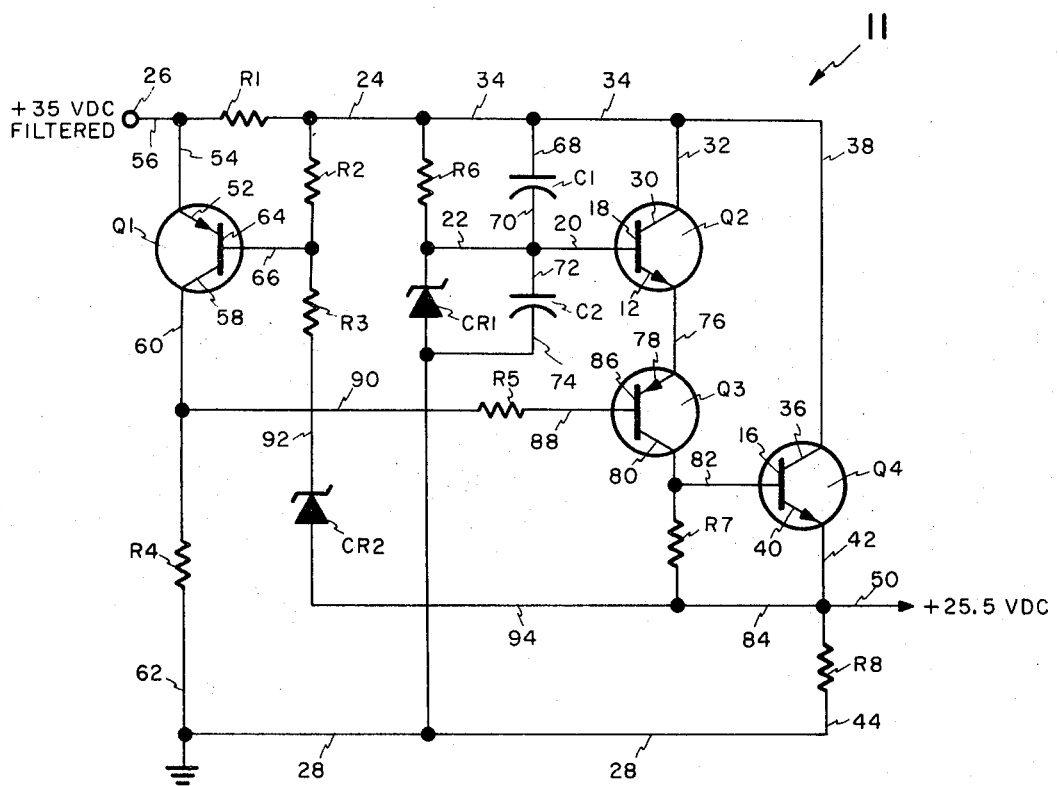
FIG. 2 shows diagramatically an overload circuit modification of the basic circuit of FIG. 1 and incorporating the subject invention to provide short circuit protection for the power supply.

In FIG. 2 is shown a complete circuit, incorporating the subject invention. In the circuit of FIG. 2 there is provided, in accordance with the invention, an additional overload sensing resistor R1, a trigger transistor Q1, and series switching transistor Q3 of type PNP to provide overload protection and a latching zener CR2 to maintain the circuit inoperative until the overload cause is removed and the circuit recycled. The values and identity of the elements in FIG. 2 are as follows:

| | | |
|---|---|---|
| R1 = 0.2 ohms | Q1 = 2N2905A | CR1 = 27 VDC |
| R2 = 100 ohms | Q2 = 2N1893 | CR2 = 20 VDC |
| R3 = 1 K | Q3 = 2N2905A | C1 = 0.001 µf |
| R4 = 6.8 K | Q4 = 2N4906 | C2 = 0.1 µf |
| R5 = 1 K | | |
| R6 = 1 K | | |
| R7 = 10 K | | |
| R8 = 2 K | | |

In FIG. 2 the numerical and letter identification of identical elements and lines is retained for ease in comparison. In the circuit, identified generally by numeral 11, of FIG. 2, the trigger transistor Q1 has its emitter 52 connected by lines 54 and 56 to the d.c. voltage source 26 and its collector 58 connected through a line 60, resistor R4 and a line 62 to grounded line 28. The sensing resistor R1 is connected between lines 24 and 56 to carry load current. Bias for the trigger transistor Q1 is obtained from the downstream side of resistor R1 through a balancing resistor R2 which is connected to the base 64 of Q1 through line 66.

As in the basic supply circuit of FIG. 1, the current source amplifying transistor Q2 of FIG. 2 has its collector 30 connected through lines 32 and 34 to line 24, and its base 18 connected through lines 20 and 22 and resistor R6 to line 24, the zener CR1 being connected from line 22 to grounded line 28. Capacitors C1 and C2 are connected respectively across resistor R6 and the CR1 as indicated by lines 68, 70, 72 and 74 for noise suppression. Also as in the basic circuit of FIG. 1, the series regulating transistor Q4 is connected from line 24 via lines 34 and 38, collector 36, base 16, emitter 40, line 42, resistor R8 and line 44 to the grounded line 28.

However, in contrast to the circuit of FIG. 1, the base 16 of Q4 receives its bias from the series switching transistor Q3 which in turn is responsive to the condition of the trigger transistor Q1. Thus, the emitter 12 of Q2 is connected by line 76 to the emitter 78 of transistor Q3. The collector 80 of Q3 is connected by line 82 to the base 16 of transistor Q4 and through resistor R7 and line 84 to the output line 50 of the circuit. The base 86 of the series switching transistor Q3 is connected by a line 88, resistor R5 and a line 90 to line 60 connected to the collector 58 of the trigger transistor Q1.

In the arrangement of FIG. 2 as thus far described the sensing resistor R1, trigger transistor Q1 and series switching transistor Q3 operate to control the "on" - "off" condition of the series regulating transistor Q4. Thus, the circuit operates normally, passing load current through Q4, when the voltage drop across R1 is less than (−) 0.5 volts with Q1 in normally "off" condition and the base 86 of Q3 held to zero volts d.c. through 7.8 K (resistors R4 and R5) to keep Q3 in "on" condition and maintain operation of Q4 in "on" condition. The saturated $V_{CE}$ of Q3 is 0.5 VDC maximum and therefore the ouput voltage is $V_{CR1} - 2 V_{bc} - V_{CES\ AT}$ or about 0.5 VDC below the + 26 VDC level obtained from the basic circuit of FIG. 1. When the load current rises such that the drop across the sensing resistor R1 turns Q1 "on," then its positive voltage output applied via lines 60 and 90, resistor R5 and line 88 to the base 86 of Q3 turns Q3 "off" and no base current flows via line 82 to the base 16 of Q4. Hence transistor Q4 is conditioned to "off" condition and the flow of current to the overload fault is interrupted.

When the series regulating transistor Q4 is conditioned to "off" condition as described above as a result of overload fault condition, the current through the sensing resistor R1 is interrupted and the trigger transistor Q1 is conditioned to "off" condition which would result in reestablishment of load current through Q4 prior to removal of the fault condition.

In accordance with a further aspect of the invention, a latching zener diode CR2 is provided to hold the trigger transistor Q1 in "on" condition. Thus, the base side of the diode CR2 is connected through a line 92, resistor R3 and line 66 to the base 64 of trigger transistor Q1. The anode side of diode CR2 is connected via a line 94, line 84 and resistor R8 to grounded line 28.

In operation, due to the low value of load impedance in an over-current condition, CR2 is held to zero VDC and therefore Q1 is held in "on" condition until the overload is removed or the power supply is recycled whereupon the circuit will regulate again.

For purpose of explanation of the invention, a positive supply circuit has been shown and described. It is to be understood that the circuit for a negative supply is symmetrical and can be used in the same application.

We claim:

1. In a voltage regulated power supply for connection to a voltage source and a voltage regulated load output line and employing a series regulating transistor having a base and connected to pass current to the load line, and a current source amplifying transistor having a base and connected to pass a regulating current to the base of the series regulating transistor together with a reference voltage zener diode connected to the base of said current source transistor and to ground, an improved overload circuit means providing short circuit protection for said power supply circuit comprising in combination:

a. a series switching transistor having a base and being connected to pass the output of said current source transistor to the base of said series regulating transistor to control the base current on the latter,
   b. a sensing resistor connected in series with the voltage source to carry load current,
   c. a trigger transistor connected to the source and to the base of said series switching transistor,
   d. said trigger transistor having its base connected to the load side of said sensing resistor to shut off base current to said series switching transistor to remove base drive from the series regulating transistor responsive to an overload condition.

2. Apparatus according to claim 1, including
   a. a latching zener diode connected to the base of said trigger transistor and to said regulated output line to maintain an "on" bias for said trigger transistor when the actuating bias of said sensing resistor is removed therefrom by inactivation of said series regulating transistor thereby to automatically maintain said power supply in inoperative condition until the load short is removed and the circuit recycled for operation.

* * * * *

UNITED STATES PATENT OFFICE
CERTIFICATE OF CORRECTION

Patent No. 3,748,569      Dated July 24, 1973

Inventor(s) Gilbert Haven Frank et al.

It is certified that error appears in the above-identified patent and that said Letters Patent are hereby corrected as shown below:

On the cover sheet [73] Assignee: "The United States of America as represented by the Secretary of the Army" should read -- The United States of America as represented by the Secretary of the Navy --.

Signed and sealed this 29th day of January 1974.

(SEAL)
Attest:

EDWARD M. FLETCHER, JR.
Attesting Officer

RENE D. TEGTMEYER
Acting Commissioner of Patents